March 24, 1970  R. L. AMSTER  3,502,592
CALCIUM AND STRONTIUM β-ALUMINA PHOSPHORS
ACTIVATED BY TERBIUM AND EUROPIUM
Filed July 26, 1967

INVENTOR.
ROBERT L. AMSTER
BY
ATTORNEY

United States Patent Office 3,502,592
Patented Mar. 24, 1970

3,502,592
CALCIUM AND STRONTIUM β-ALUMINA-PHOSPHORS ACTIVATED BY TERBIUM AND EUROPIUM
Robert L. Amster, Great Neck, N.Y., assignor to General Telephone & Electronics Laboratories Incorporated, a corporation of Delaware
Filed July 26, 1967, Ser. No. 656,159
Int. Cl. C09k 1/68
U.S. Cl. 252—301.4   6 Claims

ABSTRACT OF THE DISCLOSURE

A phosphor system consisting of calcium or strontium β-alumina activated by divalent europium and trivalent terbium and having the general formula $$ZO \cdot 6Al_2O_3 : xEu^{2+}, yTb^{3+}$$

where Z is an alkaline earth selected from the group consisting of calcium and strontium, $x$ is a quantity in the range 0.025 to 0.25 and $y$ is a quantity in the range 0.025 to 0.30. These phosphors are photoluminescent and are suitable for use in fluorescent lamps.

BACKGROUND OF THE INVENTION

Field of the invention

This invention relates to fluorescent materials which emit light in the green region of the spectrum when excited by ultraviolet radiation. In particular, it is related to a series of phosphors comprising calcium or strontium β-alumina activated by divalent europium and trivalent terbium and to a method for making such phosphors.

Description of the prior art

Manganese activated alkaline earth β-alumina phosphors are well known as are luminescent compositions consisting of terbium activated aluminum oxide (see "Some Aspects of the Luminescence of Solids," Kroeger, Elsevier Publishing Company, Inc., 1948). Also, as disclosed in my copending U.S. patent application Ser. No. 654,454, filed July 19, 1967, strong green emission may be obtained from calcium fluoride activated by divalent europium and trivalent terbium. Further, it has been found that calcium and strontium β-aluminas activated by terbium exhibit weak green emission which reaches a maximum at approximately 541 nanometers when the material is excited by radiation at about 250 nanometers. Divalent europium alone in these host materials emits fluorescence at 435 nanometers.

SUMMARY OF THE INVENTION

I have discovered that when divalent europium is added to trivalent terbium activated calcium or strontium β-alumina the fluorescence intensity of the terbium is greatly enhanced for excitation over the entire 200 to 400 nanometer spectral range. This new phosphor system may be represented by the general formula $$ZO \cdot 6Al_2O_3 : xEu^{2+}, yTb^{3+}$$

where Z is an alkaline earth selected from the group consisting of calcium and strontium, $x$ is a quantity in the range 0.025 to 0.25 and $y$ is a quantity in the range 0.025 to 0.30.

Divalent europium has a broad absorption band in the ultraviolet region extending from 200 to 400 nanometers and much of the energy absorbed by the divalent europium is transferred to the trivalent terbium ions which then emit their characteristic fluorescence. Thus, trivalent terbium emission is sensitized by divalent europium. The strong emission in the band centered at 435 nanometers in $$CaO \cdot 6Al_2O_3 : Eu^{2+} \text{ and } SrO \cdot 6Al_2O_3 : Eu^{2+}$$

is largely suppressed by the addition of terbium.

These phosphors yield a bright blue-green emission suitable for use in fluorescent lamps. Surprisingly, significant photosensitization of $Tb^{3+}$ by $Eu^{2+}$ was not found in related hosts such as $$BaO \cdot 6Al_2O_3, \; CaO \cdot Al_2O_3, \; SrO \cdot Al_2O_3 \text{ and } BaO \cdot Al_2O_3$$

The phosphor may be synthesized by dry blending europium oxide, $Eu_2O_3$, and terbium oxide, $Tb_2O_3$, with powdered alumina $Al_2O_3$ and a fluoride composition defined by the formula $ZF_2$, wherein Z is selected from the group consisting of calcium and strontium. The mixture is fired for three hours at approximately 1150° C. in an hydrogen atmosphere, removed from the furnace and allowed to cool to room temperature. This method provides a more rapid and complete reaction than known methods of producing $CaO \cdot 6Al_2O_3$ and $SrO \cdot 6Al_2O_3$, wherein oxy compounds of calcium and strontium are fired in air.

DESCRIPTION OF THE PREFERRED EMBODIMENTS

Example I 0.07 gram of powdered $Eu_2O_3$ and 0.09 gram of $Tb_2O_3$ were dry blended with 1.2 grams of powdered $Al_2O_3$ and 0.18 gram of $CaF_2$. The blend was placed in an alumina boat and fired in a quartz reaction tube located in a tube furnace. The temperature in the furnace was brought from ambient to 1150° C., and held at that temperature for three hours. The reaction tube was then removed from the furnace and allowed to cool to room temperature.

The resultant phosphor $$CaO \cdot 6Al_2O_3 : 0.20Eu^{2+}, 0.25Tb^{3+}$$

was excited by radiation in the range 200 to 400 nanometers. Excitation curve A of FIG. 2 was obtained by measuring the intensity of the radiation from the phosphor at 541 nanometers as the excitation wavelength was varied through the 200 to 400 nanometer range. As shown, emission was obtained over a wide range of excitation wavelengths centered at about 310 nanometers. Curve B illustrates the emission obtained from the phosphor when it was excited by radiation having a wavelength of 310 nanometers.

Figure 1:
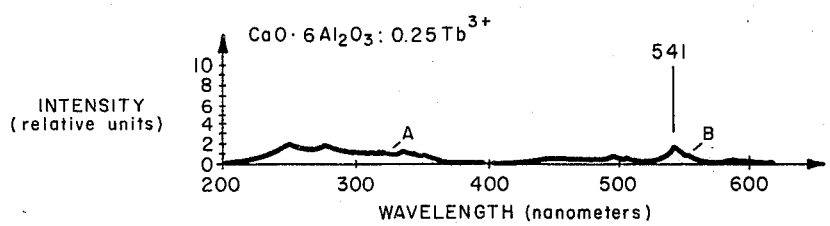
FIG 1 illustrates the excitation and emission curves for $CaO \cdot 6Al_2O_3 : Tb^{3+}$.
Figure 2:
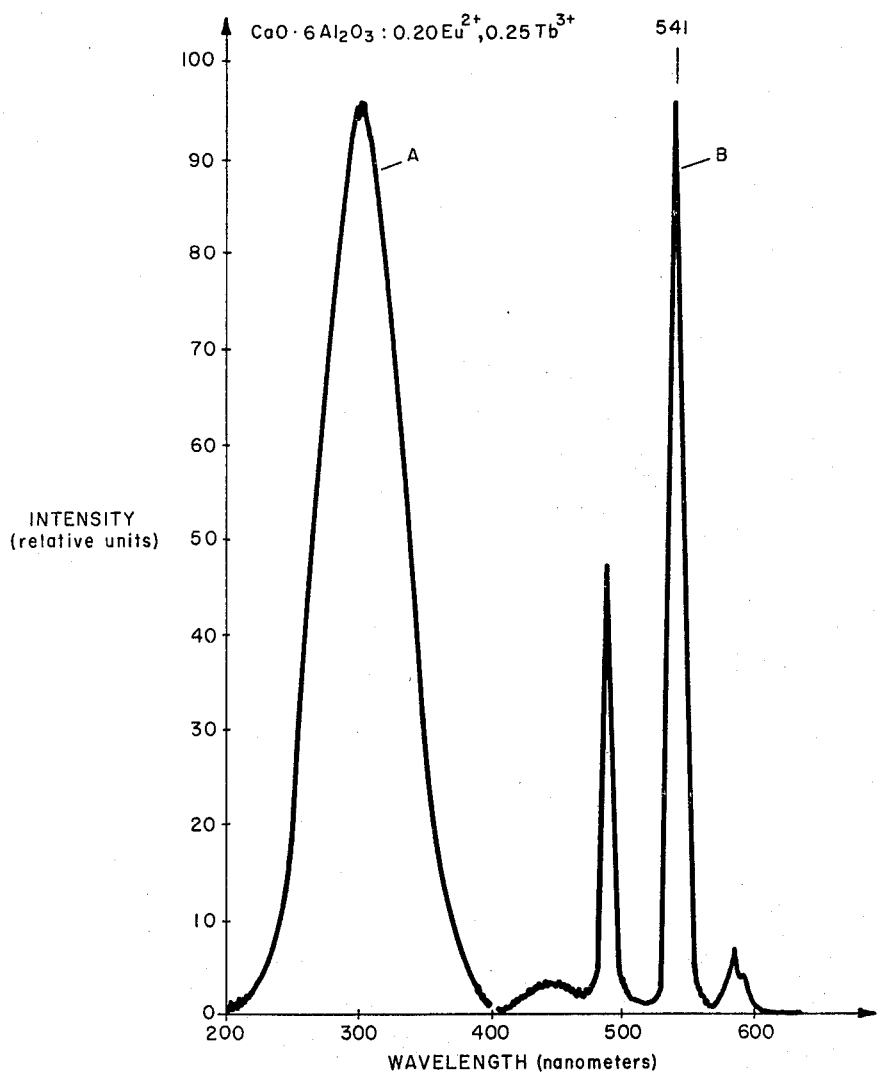
FIG. 2 shows, to the same scale as FIG. 1, the excitation and emission curves for one of the phosphors of the present invention $CaO \cdot 6Al_2O_3 : Eu^{2+}, Tb^{3+}$.

Comparison of the emission curve B of FIG. 2 for $CaO \cdot 6Al_2O_3 : 0.20Eu^{2+}, 0.25Tb^{3+}$ with that of $$CaO \cdot 6Al_2O_3 : 0.25Tb^{3+}$$

shown at B in FIG. 1 indicates that the peak emission for both materials is obtained at 541 nanometers. However, the peak intensity of $CaO \cdot 6Al_2O_3 : 0.25Tb^{3+}$ is less than one fiftieth than obtained from the phosphor $$CaO \cdot 6Al_2O_3 : 0.20Eu^{2+}, 0.25Tb^{3+}$$

Emission curve B of FIG. 1 was obtained by exciting $CaO \cdot 6Al_2O_3 : 0.25Tb^{3+}$ with radiation having a wavelength of 250 nanometers, the value producing maximum fluorescence at 541 nanometers.

The relative intensity of $$CaO \cdot 6Al_2O_3 : 0.20Eu^{2+}, 0.25Tb^{3+}$$

was also obtained by comparing it with the emission from a commercially available green-emitting phosphor, manganese activated zinc silicate, under medium and low pressure mercury lamp excitation. The results were as follows:

| Phosphor | Relative intensities | |
|---|---|---|
| | Medium pressure Hg lamp | Low pressure Hg lamp |
| $Zn_2SiO_4$=$Mn^{2+}$ (standard) | 100 | 100 |
| $CaO \cdot 6Al_2O_3$=$0.20Eu^{2+}, 0.25Tb^{3+}$ | 670 | 65 |

Example II

A phosphor was prepared by the method of Example I except that 0.3 gram of SrF were blended with 0.07 gram of $Eu_2O_3$, 0.09 gram of $Tb_2O_3$ and 1.2 grams of powdered $Al_2O_3$. The resultant phosphor $$SrO \cdot 6Al_2O_3 : 0.20Eu^{2+}, 0.25Tb^{3+}$$

had an intensity of emission at 541 nanometers similar to that of the calcium material under the same excitation conditions.

Example III

Additional samples were prepared of phosphor compositions having the formula $CaO \cdot 6Al_2O_3 : xEu^{2+}, yTb^{3+}$ in which $x$ was varied between 0.025 and 0.25 and $y$ between 0.025 and 0.30. In all cases, green emitting phosphors were obtained but their intensities were somewhat less than that exhibited by the phosphors of Examples I and II.

Example IV

Additional samples were prepared of phosphor compositions having the formula $SrO \cdot 6Al_2O_3 : xEu^{2+}, yTb^{3+}$ in which $x$ and $y$ were varied between the same limits as in Example III. Again, green emitting phosphors were obtained but their intensities were somewhat less than that exhibited by the phosphors of Examples I and II.

What is claimed is:

1. A phosphor composition defined by the formula $ZO \cdot 6Al_2O_3 : xEu^{2+}, yTb^{3+}$ wherein Z is an alkaline earth selected from the group consisting of calcium and strontium, $x$ is a quantity in the range 0.025 to 0.25 and $y$ is a quantity in the range 0.025 to 0.30.

2. The composition of matter defined by claim 1 where Z is calcium.

3. The composition of matter defined by claim 1 where Z is strontium.

4. The composition of matter defined by claim 2 where $x$ equals approximately 0.20 and $y$ equals approximately 0.25.

5. The composition of matter defined by claim 3 where $x$ equals approximately .020 and $y$ equals approximately 0.25.

6. The method of preparing a phosphor having the formula $ZO \cdot 6Al_2O_3 : Eu^{2+}, Tb^{3+}$, where Z is selected from the group consisting of calcium and strontium, comprising the steps of
   (a) blending europium oxide and terbium oxide with alumina and a fluoride composition defined by the formula $ZF_2$, the molar ratio of $ZF_2$ to alumina being between 1 and 6,
   (b) firing the blend for approximately three hours at 1150° C. in a hydrogen atmosphere, and
   (c) allowing the resultant phosphor to cool to room temperature.

References Cited

UNITED STATES PATENTS

| 3,294,699 | 12/1966 | Lange | 252—301.4 |
| 3,113,109 | 12/1963 | Brixner | 252—62.63 |

HELEN M. McCARTHY, Primary Examiner

R. D. EDMONDS, Assistant Examiner